United States Patent [19]

Kinoshita et al.

[11] Patent Number: 4,692,871
[45] Date of Patent: Sep. 8, 1987

[54] INPUT DEVICE FOR SEWING MACHINE

[75] Inventors: Tomoaki Kinoshita; Kunio Takano; Masanori Nukushina; Minoru Wada; Hiroshi Tokunaga, all of Chofu, Japan

[73] Assignee: Tokyo Juki Industrial Co., Ltd., Chofu, Japan

[21] Appl. No.: 760,650

[22] Filed: Jul. 30, 1985

[30] Foreign Application Priority Data

Jul. 31, 1984 [JP] Japan .................... 59-160778

[51] Int. Cl.⁴ .................... G06F 15/46; D05B 3/02
[52] U.S. Cl. ........................ 364/470; 112/121.12; 112/458; 364/192
[58] Field of Search .......... 364/470, 475, 468, 400, 364/188-193; 112/453, 454, 457, 458, 121.11, 121.12, 445; 318/568

[56] References Cited

U.S. PATENT DOCUMENTS

| | | | |
|---|---|---|---|
| 3,851,315 | 11/1974 | Anderson | 364/470 |
| 3,887,903 | 6/1975 | Martell | 364/200 |
| 4,104,976 | 8/1978 | Landau, Jr. et al. | 112/189 |
| 4,149,246 | 4/1979 | Goldman | 364/470 |
| 4,429,364 | 1/1984 | Maruyama et al. | 364/189 |
| 4,437,150 | 3/1984 | Dahlgren, Jr. et al. | 364/189 |
| 4,446,520 | 5/1984 | Shigeta et al. | 364/192 |
| 4,546,434 | 10/1985 | Gioello | 364/300 |
| 4,577,574 | 3/1986 | Takahashi | 112/453 |
| 4,598,376 | 7/1986 | Burton et al. | 364/470 |

Primary Examiner—Joseph Ruggiero
Attorney, Agent, or Firm—Morgan & Finnegan

[57] ABSTRACT

An input device for a sewing machine is partially provided in a portable unit connectable to a sewing machine. Efficiencies are achieved by relying on input portions present in the sewing machine. The portable input device includes control portions for inputting a stitch pattern, test running a stitch pattern, modifying a stitch pattern, writing a stitch pattern, and reading a stitch pattern. When the portable input device is coupled to the sewing machine, the stitch patterns may be executed.

3 Claims, 6 Drawing Figures

INPUT DEVICE FOR SEWING MACHINE

BACKGROUND OF THE INVENTION

This invention pertains to an input device for a sewing machine. More particularly, the invention pertains to an industrial sewing machine input device used to program stitching patterns.

In the past, industrial sewing machine input devices have been provided which recorded stitching patterns on magnetic discs, magnetic cards, or floppy discs. Thereafter, the recording media was inserted into a reading device, the stepping motor received the recorded instructions from the reading device and moved the work holder of the sewing machine in accordance with the stored instructions. Thereby, automatic stitching was performed.

In the known past, the sewing machine input device has always required its own work station. For example, the inflection points of a stitch pattern would be inputted to a digitizer by using a stylus. After checking the stitch pattern formed and pictured on a CRT (Cathode Ray Tube) display, the stitch pattern was completed. The known input devices for this purpose were bulky and required a specific work station such as a desk. Thus, the prior sewing machine input devices required much hardware to form stitch patterns, and consequently were complicated and expensive.

Prior sewing machine input work stations were also physically separated from the sewing machine. Therefore, to test run the stitch pattern required the recording media, which contained the stitch pattern, to be removed from the input device and inserted into the reading section of the sewing machine. In other words, stitching design and test sewing could not be directly connected.

Furthermore, sewing machines have peculiar individual workability due to variability and specialties between machines. Therefore, with prior input devices it was virtually impossible to make stitch pattern programs which were accurately adapted to multiple individual sewing machines.

It is therefore an object of the invention to provide a sewing machine input device which is not tied to a particular work station.

It is a further object of the invention to provide a sewing machine input device which can provide ready testing of inputted stitching patterns.

It is a still further object of the invention to provide a sewing machine input device which is handy, simple, inexpensive and effective to make stitching pattern programs and to test run the patterns in connection with sewing machine operation.

SUMMARY OF THE INVENTION

These and other objects of the invention are met by providing a portable input device for an industrial sewing machine which relies on input portions of the sewing machine. The portable inputting device includes a digitizer and a stylus for inputting a stitching pattern through the digitizer. Control programs and temporary memory are also provided in the portable unit. The portable unit is coupled to a sewing machine adapted to receive the same. The input device utilizes control and memory devices provided in the sewing machine section, thereby making the portable input unit more efficient and hence more portable.

During test running of stitch pattern, the sewing machine portion of the device is given control priority.

BRIEF DESCRIPTION OF THE DRAWINGS

The invention will be described more fully below by way of reference to the following drawings, in which.

DETAILED DESCRIPTION OF THE DRAWINGS

Figure 1:
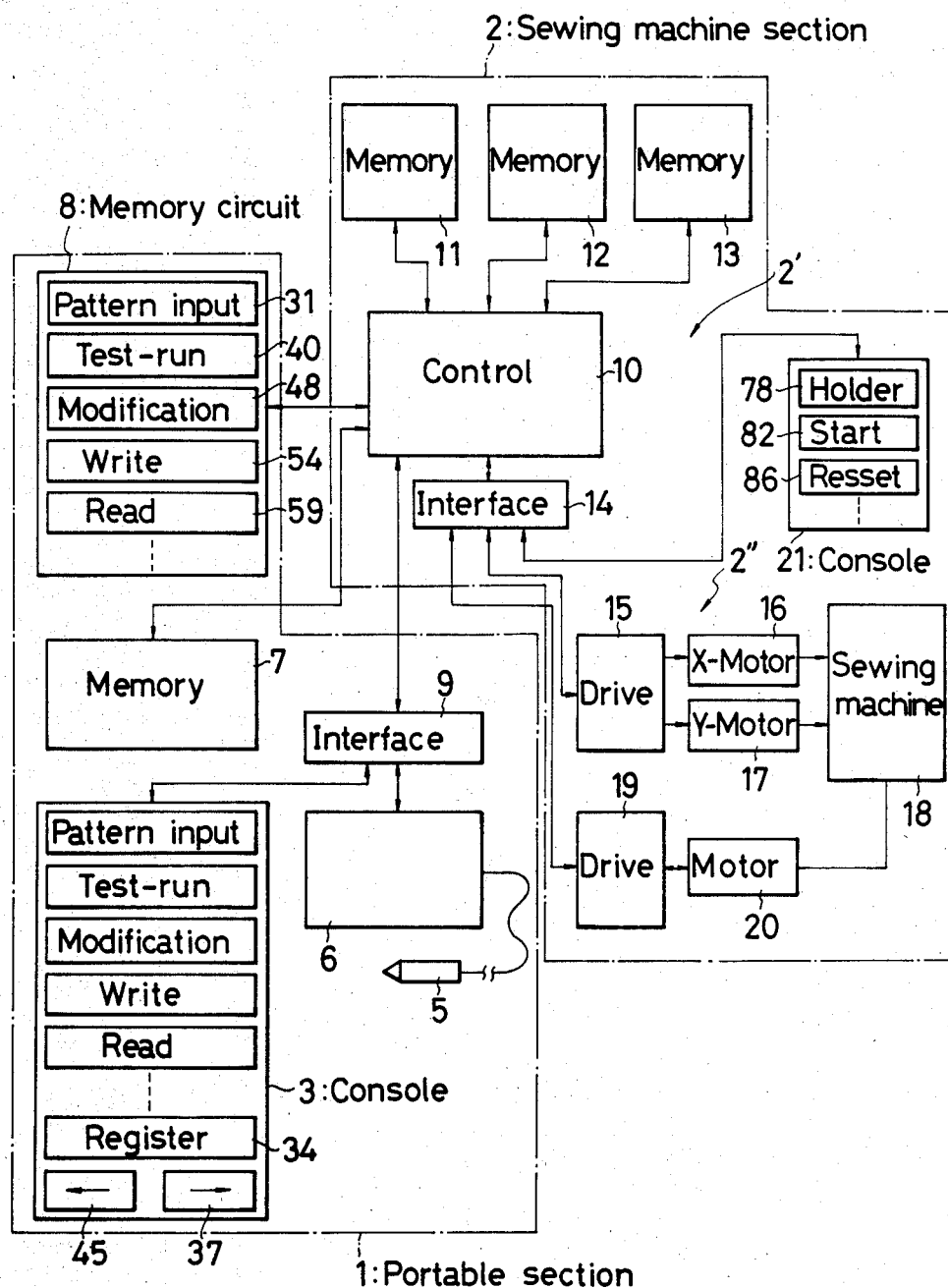
FIG. 1 illustrates a block diagram of one embodiment of instant invention.

FIG. 1 illustrates a main block diagram of an embodiment according to the invention. The embodiment of FIG. 1 consists primarily of a portable section 1 and a sewing machine section 2.

The portable section 1 includes a console 3, a digitizer 6 with a stylus 5, a memory circuit 7 which temporarily memorizes processing data, read only memory 8 which stores various system programs, and an interface circuit 9 which provides an interface between the portable section input devices and the sewing machine section 2. The console 3 is provided with a plurality of operation keys including Pattern Input, Test run, Modification, Write, Read and Register. These keys, with the exception of the Register key, conform to programs recorded in the read only memory circuits.

Console 3 also includes jog keys 37 and 45 for advancing and receding the stepping operation, respectively.

In the sewing machine section 2, control section 2' is provided which includes a control circuit 10. In preferred embodiments, the control circuit 10 works as a micro-processor.

Control circuit 10 is provided with inputs from Read Only Memory 11 which stores control programs of the sewing machine section, writable memory circuit 12 which stores completed stitch patterns, and writable memory circuit 13 which temporarily stores processing data.

The sewing machine section 2 also includes a device section 2" including work holder and sewing machine motors (16, 17 and 20) and associated control devices 15, 19. Control circuit 10, through interface circuit 14 provides sewing machine control section 2' control over the driving circuit 15.

Through the driving circuit 15, a first pulse motor 16, which moves the work holder in direction of "X" co-ordinate, and a second pulse motor 17 which moves the work holder in direction of "Y" co-ordinate, are connected. Outputs of pulse motors 16, and 17 are connected to the sewing machine 18.

Driving circuit 19 is likewise connected through the interface circuit 14 to the control circuit 10. The driving circuit 19 controls the operation of the motor 20 which drives the sewing machine 18.

A sewing machine section console 21 is also provided functionally in the sewing machine section control section 2'.

During operation, the portable section 1 and the sewing machine section 2 are connected as FIG. 1 illustrates.

Figure 2:
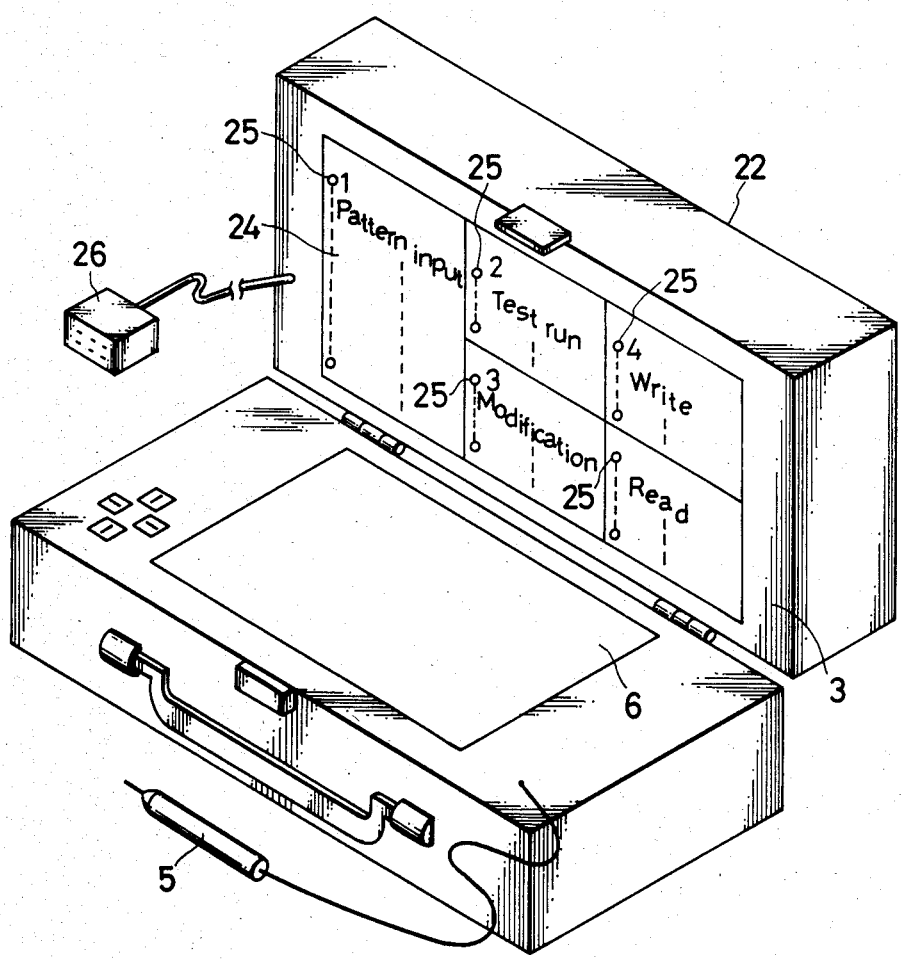
FIG. 2 is a perspective view of the portable section of the inputting device embodied according to the present invention.

FIG. 2 is a perspective view of the portable section (1, FIG. 1) arranged in a convenient carrying case 22. Item numbers in FIG. 2 correspond to the same item numbers in FIG. 1.

At the surface 24 of console 3, operation procedures are printed. When operation starts according to these procedures, the operated section is illuminated with an LED 25 (Light Emission Diode).

Figure 3A:
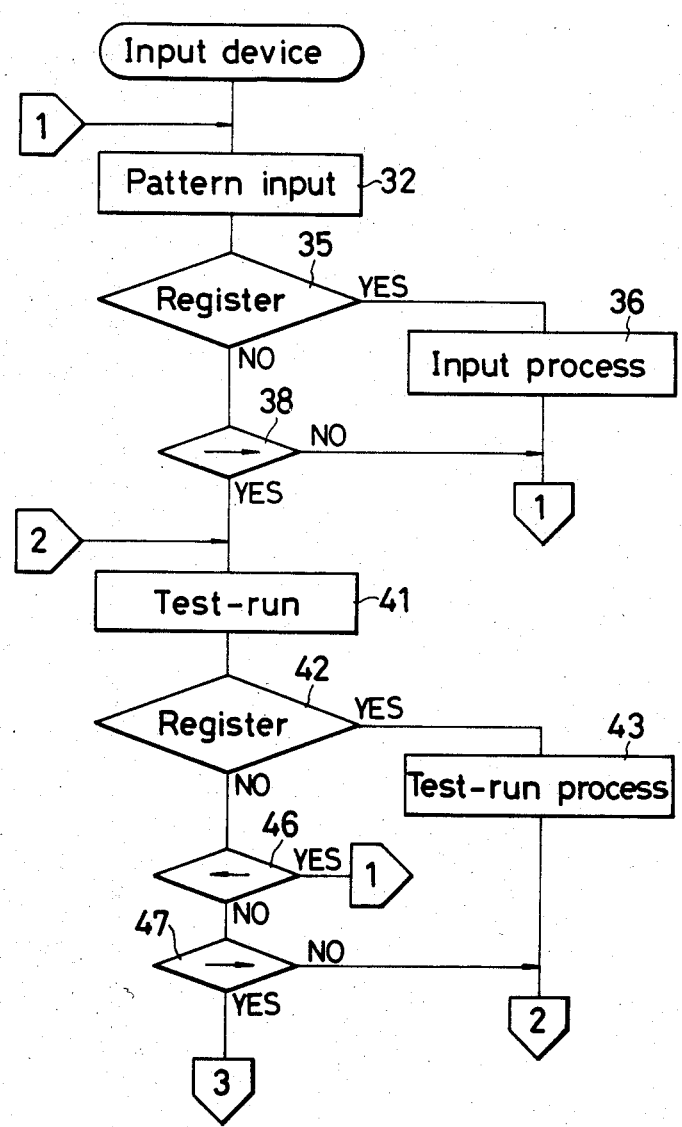
FIG. 3A, FIG. 3B and FIG. 3C are flow charts illustrating the functional sequencing of an apparatus according to the present invention.
Figure 3B:
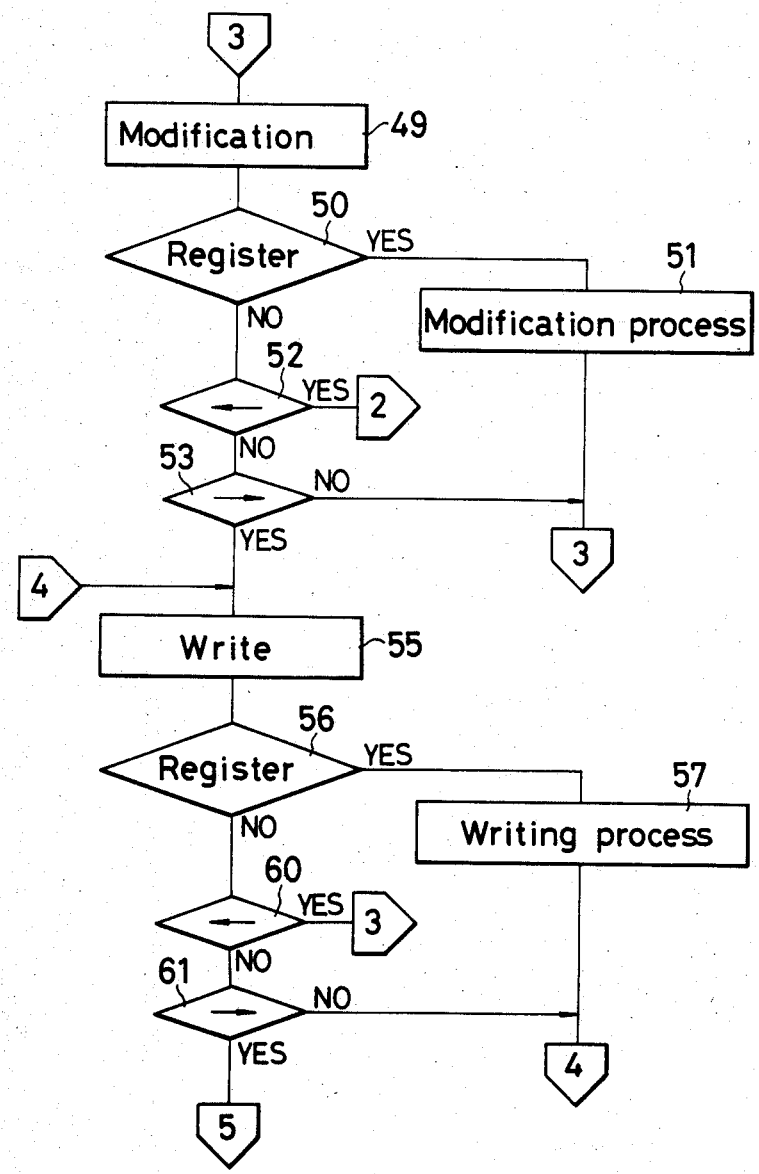
Figure 3C:
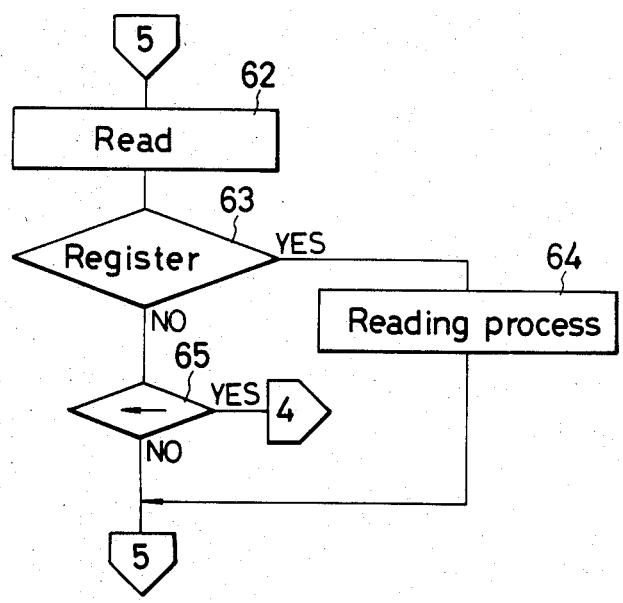

Item 26 denotes a connection plug which is used to provide logical or electronic connections between the portable input section to the sewing machine section. Space may be provided under a digitizer 6 which space may be used for storing books or machine parts The flow charts of FIG. 3A to FIG. 3C illustrate functional aspects of one embodiment of the invention. During the inputting process, the portable section 1 may be placed on the table of sewing machine 2 which comprises control section 2' and device section 2''. The portable section 1 may then be connected to the control section 2' by plug 26.

With the appropriate connection made, the pattern input mode 31 may be selected (refer to FIG. 3A block 32). When the register operation key 34 is inputted (refer to FIG. 3A block 35), the input process starts (refer to FIG. 3A block 36) The input process may then be performed by picturing inflection points of a stitch pattern on the digitizer 6 with a stylus pen 5. (Inflection point, here, can mean either the starting point and the end point in the case of straight line; the starting point, end point and middle point in the case of circular arc; or each stitch point in the case of point by point input.) By this action, the stitch pattern data is produced in the control circuit 1 and is written in memory 7. The stitch pattern is simultaneously written to sewing machine control section memory 12.

When j jog key 37, which advances stepping, is inputted (refer to FIG. 3A block 38), the test-run stitch mode 40 is selected (refer to FIG. 3A block 41).

When register key 34 is inputted (refer to FIG. 3A block 42), the test-run stitch is physically performed. (Refer to FIG. 3A block 43). Accordingly, the stitching pattern data is read from memory 7 and responding to the read pattern data, the pulse motor 16, 17 are driven. The sewing machine motor 20 is also driven responding to the same stitch pattern and thus the stitch pattern is test run using the same conditions present with general stitching. Since the test-run stitch is performed by connecting portable section 1 to the sewing machine directly, it is possible to make the stitch pattern adapted to each sewing machine's specialty or deficiency.

During the test-run operation, if jog key 45, which recedes the stepping function is inputted (refer to FIG. 3A block 46) the input mode 31 is selected. Likewise during test-run, if jog key 37 is inputed (refer to FIG. 3A block 47) the modification mode 48 is selected (refer to FIG. 3B block 49).

When register key 34 is inputted (refer to FIG. 3B block 50), the modification process starts (refer to FIG. 3B Block 51). By this modification process, a stitch pattern being drawn-up or developed may be modified. In this mode, when jog key 45 is inputted, test run mode 40 is selected; when jog key 37 is inputted, writing mode 54 is selected (refer to FIG. 3B Block 52. 53. 55).

When register key 34 is again inputted (refer to FIG. 3B Block 56 , the writing process is performed (refer to FIG. 3B Block 57 . By this writing process, the stitch pattern now being drawn is read from the memory circuit 7 and may be written into the address of memory circuit 12 corresponding to a particular unique pattern number. The memory circuit 12 may include a floppy disc which may thereafter be taken out from the sewing machine and provided to the reading section of other sewing machines to be read thereby.

During the writing mode, when jog key 45 is inputted, the modification mode 48 is selected. If jog key 37 is inputted, read mode 59 is selected (refer to FIG. 3B Block 60, 61 and FIG. 3C Block 62). When the register key 34 is inputted, the reading process is performed (refer FIG. 3C Block 63, 64).

By the reading process, the stitch patterns already registered can be read. Subsequently, if jog key 45 is inputted, writing mode 54 is selected (refer to FIG. 3C Block 65).

Figure 4:
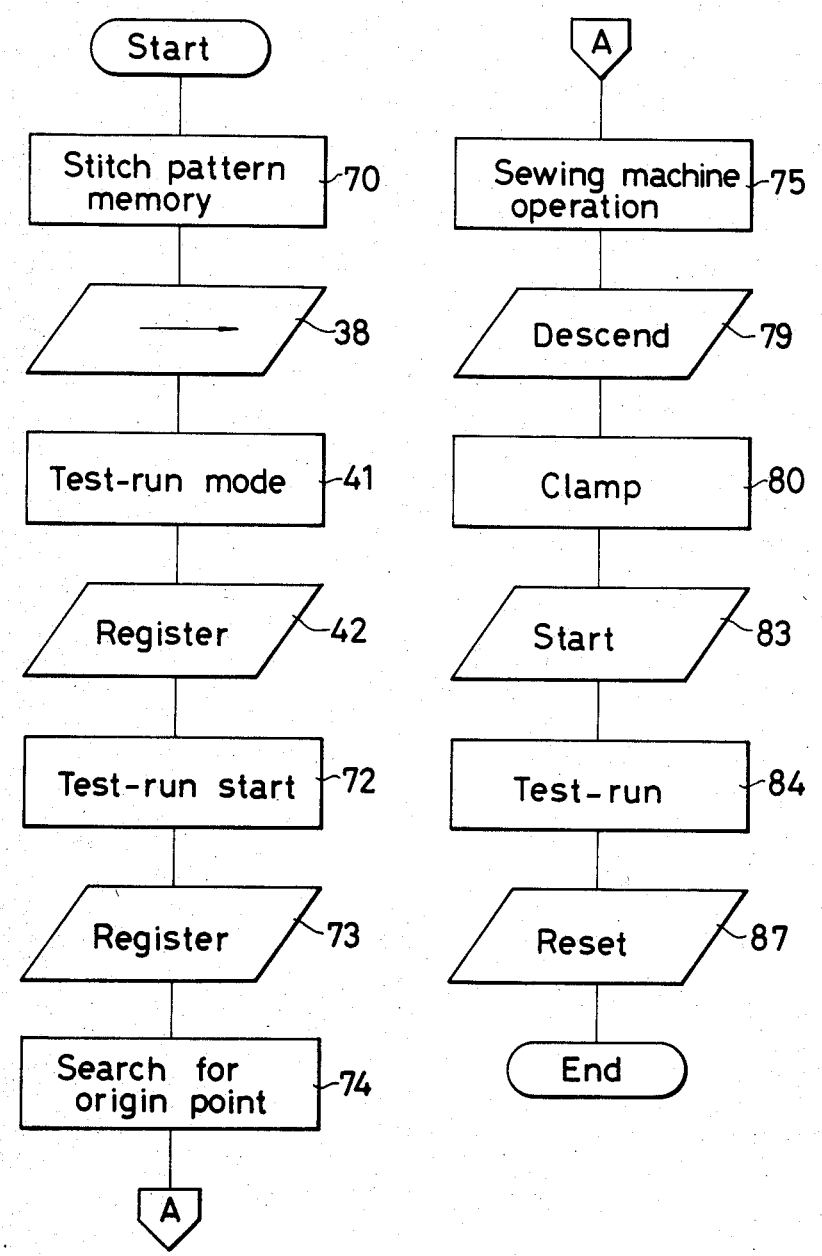
FIG. 4 is a flow chart illustrating a stitch test-run sequence.

The operation of a stitching test run will now be described in greater detail. FIG. 4 illustrates a flow chart for a stitching test run. Where the stitch pattern to be test run is already completed, reading mode 59 is performed and the stitch pattern is read from memory circuit 12 and is provided to memory circuit 7 (refer to FIG. 4, Block 70). Where the stitch pattern to be test run is under development, the stitch pattern data is already memorized in circuit 7 (refer to FIG. 4 Block 70). Under such condition, as block 38 of FIG. 3A shows, if jog key 37 is inputted, the test-run stitch mode 40 is selected refer to FIG. 4 Block 41 ; if the register key 34 is inputted (refer to FIG. 4 Block 42), then test-run process starts (refer to FIG. 4 Block 72).

If registration key 34 is again inputted, (refer to FIG. 4 Block 73), the control circuit 10 reads the stitch pattern data from the memory circuit 7, and the work holder is drawn back to the zero point by pulse motor 16, 17 by a known method. After regaining the zero-point, the work-holder will be moved to the second zero-point or to stitch start point according to the above described program. (Refer to FIG. 4 Block 74).

When the work holder is moved to the zero-point or to the stitch start point, control will be transferred to sewing machine 2. Control will then be performed at control section 2' (refer to FIG. 4 Block 75).

The operation of the sewing machine control proceeds as follows. When the work-holder switch 78 at console 21 is inputted, the work holder (not shown) clamps down (refer to FIG. 4 Block 79) and secures the workpiece (not shown) (Refer to FIG. 4 Block 80). During this condition, if the start switch 82 is inputted (refer to FIG. 4, Block 83), the control circuit 10 drives the pulse motors 16, 17 and sewing motor 20 to perform test run stitching (refer to FIG. 4 Block 84) responding to the stitch pattern data stored in memory circuit 7.

When the test run stitching is finished, the reset switch 86 may be inputted (refer to FIG. 4, Block 87), thereby transferring control to the portable section 1 of the input device.

Thus, input device is divided into the control section of the sewing machine and the portable section, and during operating time, both are connected. Thereby, the portable portion of the input device is made more efficient and easily transportable. As hardware already provided in the sewing machine can be used, the production cost of the input device is low. Furthermore, since stitching patterns can be drawn up while the portable unit is in direct connection with sewing machine, test-run of stitching can be easily and readily performed. Thereby, stitching patterns can be adapted to the characteristics of each particular sewing machine.

As many widely different embodiments of the invention may be made without departing the spirit and scope therein, it is to be understood that the invention is not limited to the specific embodiments herein described except as defined in the appended claims.

We claim:

1. A sewing machine input device for inputting stitch patterns of a workpiece, comprising:
   a first portion including a digitizer for inputting stitching patterns, a first memory circuit logically coupled through control means to said digitizer for storing said stitching patterns, a second memory circuit logically coupled to said control means for storing various control programs, and command generating means logically coupled through said control means to said second memory circuit for selecting among said control programs; and
   a second portion including said control means, said control means being adapted to execute said selected control programs;
   said first portion being coupled to said second portion through said control means during the inputting operation;
   said second portion being provided in a sewing machine; and
   wherein said control means is adapted to control inputting of a stitch pattern, test-running the stitch pattern, modifying the stitch pattern, writing the stitch pattern and reading the stitch pattern.

2. A sewing machine input device for inputting stitch patterns of a workpiece, comprising: a first portion including a digitizer for inputting a stitch pattern, said digitizer being logically coupled to control means, a first memory circuit logically coupled to said control means for storing a first control method for governing test-running of said stitch pattern, and first command means logically coupled to said control means for selecting and commanding said first control method; and a second portion including said control means, a second memory circuit logically coupled to said control means for storing a second control method and second command means logically coupled to said control means for selecting and commanding said second control method, said control means being adapted to execute said first control method commanded by said first command means, such that when said first portion is operational, said second portion is connected thereto through said control means, and such that by commanding the test-running of said stitch pattern, said control means executes the first control method which is commanded by said first control means, and wherein said first portion is provided in a portable unit and said second portion is provided in a sewing machine work station.

3. A sewing machine input device, as recited in claim 1, wherein said first portion is provided in a portable unit.

* * * * *